(12) United States Patent
Mandler (10) Patent No.: US 9,751,171 B2
(45) Date of Patent: Sep. 5, 2017

(54) METHOD TO PROCESS SPECTACLE LENS BLANKS

(71) Applicant: Roland Mandler, Heuchelheim (DE)

(72) Inventor: Roland Mandler, Heuchelheim (DE)

(73) Assignee: OptoTech Optikmaschinen GmbH, Wettenberg (DE)

( * ) Notice: Subject to any disclaimer, the term of this patent is extended or adjusted under 35 U.S.C. 154(b) by 77 days.

(21) Appl. No.: 13/777,211

(22) Filed: Feb. 26, 2013

(65) Prior Publication Data

US 2013/0221589 A1 Aug. 29, 2013

(30) Foreign Application Priority Data

Feb. 27, 2012 (DE) .................. 10 2012 101 581

(51) Int. Cl.
*B23Q 3/06* (2006.01)
*B24B 13/00* (2006.01)
(Continued)

(52) U.S. Cl.
CPC ............. *B23Q 3/062* (2013.01); *B23Q 3/061* (2013.01); *B23Q 3/088* (2013.01); *B24B 13/005* (2013.01); *B24B 13/0037* (2013.01); *B24B 27/0069* (2013.01); *Y10T 29/49998* (2015.01); *Y10T 82/10* (2015.01); *Y10T 82/2593* (2015.01); *Y10T 409/303752* (2015.01); *Y10T 409/309072* (2015.01)

(58) Field of Classification Search
None
See application file for complete search history.

(56) References Cited

U.S. PATENT DOCUMENTS 2,194,780 A * 3/1940 Andersen ...................... 451/256
4,829,716 A 5/1989 Ueda et al.
(Continued)

FOREIGN PATENT DOCUMENTS

DE 951 259 10/1956
DE 39 24 078 9/1992
(Continued)

OTHER PUBLICATIONS

DE 3924078 English Machine Translation.*
DE 195 04 368 English Machine Translation.*

*Primary Examiner* — Joseph J Hail
*Assistant Examiner* — Brian Keller
(74) *Attorney, Agent, or Firm* — Clark & Brody (57) ABSTRACT

Manufacturing spectacle lenses using lens blanks blocked onto holding elements is laborious and time-consuming. Furthermore the manufacture is rendered difficult by different surface curvatures on the receiving side of the lens blanks. The purpose of the invention is to remedy such drawbacks. Accordingly this invention relates to equipment for processing lens blanks comprising a workpiece turret supported rotatably about a main axis of rotation, said turret being fitted with at least two workpiece receptacles configured each outside the main axis of rotation and being rotatable about spindle axes, each workpiece receptacle comprising a workpiece receiving surface having a surface curvature rotationally symmetrical about the spindle axis, whereby said surface curvatures of the workpiece receiving surfaces being different from each other.

7 Claims, 4 Drawing Sheets (51) Int. Cl.
*B24B 13/005* (2006.01)
*B24B 27/00* (2006.01)
*B23Q 3/08* (2006.01)

(56) References Cited

U.S. PATENT DOCUMENTS

| | | | | |
|---|---|---|---|---|
| 8,484,820 B2* | 7/2013 | Saeki | ...................... | H01L 24/75 |
| | | | | 257/778 |
| 2007/0264915 A1* | 11/2007 | Mazoyer | ......................... | 451/64 |
| 2008/0055542 A1* | 3/2008 | Haddadi | ......................... | 351/177 |
| 2008/0169593 A1* | 7/2008 | Shen | ..................... | B25B 11/005 |
| | | | | 269/21 |
| 2011/0256806 A1* | 10/2011 | Monnoyeur | .................... | 451/10 |

FOREIGN PATENT DOCUMENTS

| | | |
|---|---|---|
| DE | 195 04 368 | 8/1996 |
| DE | 10 2007 031 703 | 1/2009 |
| WO | 2004/080653 | 9/2004 |

* cited by examiner

METHOD TO PROCESS SPECTACLE LENS BLANKS

The present invention relates to equipment to process spectacle lens blanks, hereafter lens blanks, further to a method to process lens blanks using such equipment, and to an application of said equipment.

Most spectacle lenses are made from circular lens blanks having diameters substantially larger than the dimensions of the spectacle lenses might seem to call for. The reason lies in the spread in size of spectacle lenses. The lens blanks either are plain blanks (both sides being optically ineffective) or semi-finished products (having one optically active/effective side) made of plastic or mineral glass. The processing is in the form of chipping said blanks on milling, lathing, grinding respectively polishing machines.

To make processing possible, the lens blanks must be clamped on workpiece receptacles of the processing equipment. To ensure that, besides central surface processing, such processing also be feasible in the edge zones, the lens blanks are affixed in the processing procedures of the state of the art, to so-called block elements, either to their front or back side depending on which side is being processed. This procedure is called "blocking". Accordingly the "blocked" side is the receiving side and usually is already fitted with an optically effective surface that was already made by mechanical processing or chip-free shaping at the half-finished component.

The block elements at the receiving side already are fitted with a structured connection surface for the purpose of blocking. To implement blocking, the blocking element and the spectacle-glass blank are clamped in such manner in an appropriate device that a gap remains subtended between them. This gap is filled with a molten connecting material. One may use Wood' alloy, a heavy-metal alloy, a uv-curing bonding agent or other materials such as wax. Following curing, the connecting material bonds respectively to the structured connecting surface of the block element by means of positive locking fit and/or friction locking and to the receiving side of lens blank by adhesion (bonding), frequently such bonding being enhanced by a protective layer of enamel or by a protective foil.

The state of the art incurs a drawback in that said blocking is time-consuming and uneconomical. Also when the processing is with a heavy metal, a depletion of 2 g or so is incurred for each blocked lens blank. For a production of the order of 500 million spectacle lenses, the ecology would be loaded with about 500-700 (metric) tons of heavy metal a year. When using uv-curing bonding materials, the yearly waste is about 12,000 to 15,000 (metric) tons.

Another drawback of the wax and plastic blocking procedure is the degradation, due to substantial heat application, of already extant optically effective surfaces.

Also, the block elements comprise a clamping edge in the form of a cylindrical surface allowing them to be clamped in the clamping tools of the processing equipment. Following blocking, the block element is affixed together with the affixed lens blank fixed in/at a processing equipment.

The state of the art includes various processing equipment. Illustratively the WO 2004/080653 A1 discloses milling tools having cylindrical cutters or end-mill cutters and/or lathes with chisels. For further surface refinements, grinding and/or polishing machines are used subsequently. Such machines either are CNC controlled multi-axes processing machines or robots.

Following edge and surface processing by milling and lathing, the optical surface is ground to a finish and polished. Appropriately the tools move during processing beyond the edge of the residual lens blank. As a result undesirable compression is applied to the edge, entailing substantial material abrasion. The previously accurate lens geometry is degraded thereby. Such a flattening of the lens geometry in the edge zone is a considerable optical drawback.

Another drawback is incurred in that following edge processing, the spectacle lenses no longer are circular but instead correspond to the various shapes and sizes of the spectacle mounts. Substantial costs are entailed as a result because, following blocking, workpieces (lens blanks/spectacle lenses) that were shaped wholly individually run through further finishing. The cost/complexity for the clamping elements of all downstream moving and processing devices will be commensurately high. Further operational steps are indeed required after blocking. Illustratively the blocked spectacle lenses must be washed before being coated. While being washed the blocked spectacle lenses are clamped in frames, whereas while coating they lie in shells.

The objective of the present invention is to remedy fee drawbacks of the state of the art and to create equipment with which to fast and economically process spectacle lenses of high optical surface quality and to minimize their thickness. The invention also takes into account supply and storage costs for tools, fasteners and materials. Also the invention relates to a method implementing the use of such equipment.

The invention relates to equipment which processes lens blanks and is fitted with a workpiece turret that is rotatably supported about a main axis of rotation and has at least two workpiece receptacles which are supported at said turret and rotatable about spindle axes, each workpiece receptacle comprising a workpiece receiving surface evincing a surface curvature which is rotationally symmetrical about the spindle axis, and said surface curvatures of said workpiece receptacle being different from each other.

This workpiece turret henceforth makes it possible now to receive (spectacle) lens blanks of different surface curvatures. Accordingly a received lens blank is supported, during subsequent processing, from the direction of the receiving side not to be processed, by the workpiece receptacle surface. The surface geometry to be processed can be finished in commensurately accurate manner. On account of the surface curvatures being different the thickness of finished spectacle lenses can be minimized.

Furthermore, the workpiece is received directly in the equipment rather than during blocking by means of preset and partly manual operational steps. The processing rate is commensurately high. The workpiece receptacles always are situated at the workpiece turret and need not be looked for or be exchanged. Again, the wastes are lower than when blocking.

Preferably the workpiece receiving surface is concave. In this case lens blanks that have a convex front side, that is, a convex receiving side, may be received. A harmonious, uniform surface is usually desired for design reasons at the front side of a spectacle lens. On the other hand, unevenness on the rear side to remedy visual errors for design reasons are less interfering. Where possible, the front side should be already optically effective. In that case said front side needs no farther processing, and time and costs are saved.

In another embodiment mode of the present invention, the workpiece turret is rotatable through 360° about its main axis of rotation. This feature allows selecting the particular shorter path/lesser angle of rotation when rotating the workpiece turret about its main axis of rotation when positioning the different workpiece receptacles. In this way such rotation is especially rapid. Also the workpiece turret may be rotated about the main axis of rotation in timed/synchronized and revolving manner. Different processing steps may take place at the different stop positions. Workpiece receptacles not being used may be skipped. In this manner the invention allows simultaneously receiving different lens blanks with different surface curvatures and guiding tools to them.

Orienting the workpiece turret's main axis of rotation in the horizontal, geodetic direction was found being eminently practical. In this way the entire equipment may be made accessible while climbing (stepping) facilities for maintenance and cleaning are not needed.

In especially appropriate manner, the said workpiece turret shall be fitted with six workpiece receptacles. When using six different workpiece receptacle surfaces, it is possible to receive six different models of blanks. Six models of blanks suffice to manufacture about 90% of the spectacle lenses in current demand. Illustratively the staggering/graduation shown below of blank models, where the convex front side/receiving side evinces the following radii $R_{CX}$, is quite useful:

Blank model 1: $R_{CX}$=1,000.0 mm
Blank model 2: $R_{CX}$=250.0 mm
Blank model 3: $R_{CX}$=125.0 mm
Blank model 4: $R_{CX}$=83.0 mm
Blank model 5: $R_{CX}$=71.0 mm
Blank model 6: $R_{CX}$=62.5 mm.

The above data allow manufacturing the following spectra:

+8 diopter through −8 diopter, spherical
−4 cyl. toric
adding 0.75 to 3.75 diopter.

Where needed, the above graduation may be modified. Also, the surface curvatures need not mandatorily evince a radius. Other optically effective surface curvatures also may be used. For instance this may be the case for blank models of which the receiving side is subtended by tangentially adjoining rings of different radii, said radii becoming smaller as the distance from center outward is increasing. Free-form surfaces on the receiving side also are feasible.

The surface curvatures of the workpiece receptacle surfaces should match the surface curvatures of the blank models to be used. Accordingly a further design of the invention stipulates graduating the surface curvatures of the workpiece receptacle surfaces. This feature allows receiving different blank models having different surface curvatures and makes e a large spectacle glass spectrum possible.

Moreover the workpiece receptacles each should evince the same outside diameter. This uniformity simplifies in particular programming CNC driven motions, for instance of the workpiece turret or of the tools. The diameters of the blank models should be identical as well. This feature simplifies edge processing. Alternatively however the lens blanks, alter being received in the workpiece receptacle, can be constrained to a standardized diameter by means of a processing step. Also the lens blank diameter should be only insignificantly larger than that of the workpiece receptacles at least after following being inserted into the workpiece receptacle and prior to the processing of the processed side. i.e. of the optical surface, in particular said diameter should not project by more than 4 mm. In this manner the lens blank is always supported from the direction of the receiving side.

To process a received lens blank in a manner as simple as possible and hence economically and with high quality, a further embodiment mode of the invention stipulates that the spacing between the workpiece receptacles and the main axis of rotation is the same. As a result tools configured around the main axis of rotation are adjustable over minimized paths which can be supported with minimal play and low vibrations.

To carry out specific processing stages, a preferred embodiment mode of the invention stipulates driving each workpiece receptacle separately in rotation about its spindle axis. Accordingly not all manufacturing motions need be carried out by some tools, instead adjusting motions for instance of a lathe chisel are sufficient. Also the position of the received lens blank is stabilized by the rotation, offering high surface quality daring processing.

Another design of the invention where the workpiece receptacles are uniformly distributed radially to the workpiece turret's main axis offers especially high productivity. This feature allows timed rotation of the workpiece turret, whereby the workpiece receptacles can be alternatingly moved to the work station.

In this design the spindle axes of the workpiece receptacles always should be arrayed at the same angle to the workpiece turret's main axis of rotation. As a result, a lens blank always subtends the same angle with the corresponding work stations. Illustratively the spindle axes may be situated on an imaginary cone of which the center axis is the workpiece turret's main axis of rotation.

Test runs were especially successful when the workpiece receptacles' spindle axes perpendicularly intersected the workpiece turret's main axis of rotation. It was found that all spindle axes should be situated in one plane perpendicular to the main axis. This design minimizes workpiece turret complexity and offers high rigidity, as a result of which the processed surface geometries can be manufactured in especially accurate manner and with high quality.

In another dynamically advantageous embodiment variation of the invention, the workpiece receptacles' spindle axes run parallel to the workpiece turret's main axis of rotation.

Substantial added-value is attained in one embodiment mode of the invention where each workpiece receptacle is fitted with a suction element. This suction reliably keeps the lens blank in the workpiece receptacle. Said blank can be affixed in and removed from said receptacle very quickly, completely, and in the absence of damages. Post-processing the affixed surface, for instance cleaning, is unnecessary.

To increase productivity, each suction element should be switched separately and pneumatically. As a result one lens blank may be affixed simultaneously in each of several workpiece receptacles. A further embodiment of the invention was found especially advantageous, namely that each suction element is fitted with flutings in the workpiece receiving surface and which are pneumatically connected to a suction conduit. In this manner the suction surface may be distributed in the workpiece receiving surface and as a result the lens blank is evenly stressed and held in place especially effectively.

In an advantageous complementation of the invention, operational zones are configured radially to the main axis of rotation, each zone comprising a volume intersecting the workpiece turret's rotational space. As a result different tools and devices may be configured in the various operational zones to process lens blanks.

In this respect the operational zones too should be uniformly distributed radially to the workpiece turret's main axis of rotation. As a result different workpiece receptacles may simultaneously match, different operational zones. This feature allows simultaneous and especially rapid processing of several lens blanks.

With respect to the above discussion, one embodiment mode of the invention stipulates that a milling tool fitted with a spherical cutter adjustable to and rotatable about a milling spindle be configured in a first operational zone. Such a spherical cutter is especially appropriate for rapidly, coarsely processing a lens blank. Illustratively too such a milling tool may comprise an outer periphery program to process the outer radial contour of the lens blank. Additionally a surface processing program applied to the optical surface may save much time. Lastly the milling tool may comprise an orienting notch program to fit the lens blank with an alignment mark for subsequent operational steps.

Such operational steps can be implemented in especially appropriate manner using spherical cutters of which the diameter perpendicular to the milling spindle is as large or approximately as large as its size in the direction of the milling spindle. In particular spherical cutters having a diameter between 20 and 60 mm are appropriate.

If more than said spherical cutter alone is required, complementation may be attained in that the milling tool be fitted with a tool turret having at least a second milling element differing from said first spherical cutter. In such a design, a suitable milling tool may be selected depending on need. A manual tool exchange is not necessary.

A further embodiment mode of the invention concerns the configuration of a lathe with an adjustable chisel in a second operational zone. A lathe allows making very fine structures in the optical surface being processed. The lathe should be fitted for that purpose with a surface program. The required turning motion of the lens blank may be implemented by rotating the workpiece receptacle about its spindle axis. Because in most cases the optical surfaces of the processed side is not rotationally symmetrical, said lathe preferably is fitted with a FASTtoolServo drive. The latter is an especially rapid and accurate actuator. Illustratively it may be driven by piezo elements. Alternatively linear motors and Voice-Coil actuators also may be used.

Where a single chisel is inadequate to meet all requirements, the lathe may be fitted with a second chisel different from the first.

The lathe furthermore should be supported in a way it can be driven to change the angular position during the surface program relative to the spindle axis of the corresponding workpiece receptacle. Microgrooves in the surface may be avoided/reduced in this manner.

The stresses exerted on the workpiece turret and any consequent vibrations are most effectively avoided when the lathe tool and the milling tool are configured being opposite relative to the workpiece turret's main axis of rotation. Provided they are configured geodetically and horizontally mutually opposite, a mutual degradation by cooling means and chips will be averted.

The invention makes an especially high degree of automation possible at low defect rates by stipulating, in a third operational zone, a loader to load lens blanks into the workpiece receptacles. This loader may also operate as a loading and a discharging means. Alternatively, there is an option to set up a discharging element in a fourth operational zone to evacuate lens blanks that were processed and held in the workpiece receptacles.

Said loader should exhibit a hopper for different models of lens blanks. Said loader can then remove the related lens blanks from said hopper. During this procedure, the lens blanks may be delivered into the hopper preferably without stopping the loader. Preferably said loader handles orders in altered sequence when a blank model no longer is available in the hopper. For that purpose a recognition detector (for instance optical or mechanical) may be mounted on the hopper.

The present invention also relates to a method for processing spectacle lens blanks, (hereafter lens blanks) by means of equipment processing lens blanks and comprising a workpiece turret rotatably supported about a main axis of rotation, said turret comprising at least two workpiece receptacles which are situated outside said main axis of rotation and which are supported at the workpiece turret while being rotatable about spindle axes, each workpiece receptacle comprising a workpiece receiving surface evincing a surface curvature rotationally symmetrical about the spindle axis, whereby said surface curvatures of the workpiece receptacle surfaces being different from each other, and at least two models of blanks of different surface curvatures at the receiving side are selectable, and said method comprising the following steps:

I. Selecting a blank model,
II. Selecting a workpiece receptacle having a workpiece receiving surface of which the surface curvature corresponds to that of the receiving side of the selected blank model,
III. Positioning the selected workpiece receptacle by rotating the workpiece turret holding the workpiece receptacles about said turret's main axis of rotation,
IV. Loading a lens blank of the selected blank model into a selected and positioned workpiece receptacle,
V. Positioning the loaded lens blank to undergo subsequent processing (VI.1; VI.2; VI.3; VI.4; VI.5; VI.6) by rotating the workpiece turret about is main axis of rotation.

The above method and workpiece turret henceforth make it possible to receive lens blanks having different surface curvatures. As a consequence A received lens blank is supported during an ensuing processing operation by being braced from the direction of the receiving side which is not processed. Therefore the surface geometry to be processed can be manufactured with commensurate accuracy.

Furthermore the workpiece is received directly in the equipment rather than in the blocking process where upstream and partly manual operations occur. The rate of processing is commensurately high. The workpiece receptacles furthermore are always situated at the workpiece turret and there is no need to be search them or exchanged them. Wastes such as occurring in blocking do not arise.

The method of the invention allows using spectacle lens blanks made of glass or plastic. Said blanks should be circular to preclude vibrations due to mechanical imbalances. Moreover lens blanks evincing a rotationally symmetric receiving side and a rotationally symmetric processing side are especially appropriate for the method of the invention. To prevent operational steps, the lens blank's receiving side should already by optically effective.

Ideally the number of workpiece receptacles should be equal to the number of blank models. This feature of the method and the equipment of the invention allows manufacturing an especially wide spectrum of lenses. Storing 4 to 8, especially 6, blank models with graduated surface curvatures on the receiving side, has been found especially practical. The number of workpiece receptacles then should also correspond to the above. An easily manufactured and therefore easily computed blank model is fitted with a convex surface curvature of constant radius on the receiving side. Blank models offering especially advantageous optical properties comprise a convex surface curvature on the holding side formed by tangentially adjoining annuli of different radii, these radii becoming smaller from the center outward while increasingly spaced apart.

Basically the blank model should be selected according to prescription. Besides documentation from physician or optician a prescription is to be construed as any information concerning visual defects. Such a visual defect also may be a standardized one for small-run production. In some circumstances however the desired spectacle frame may be the decisive factor in selecting the blank model.

Accelerated production is made possible by the method of the invention and by said equipment in that each blank model includes sub-models with different surface curvatures on the processing side. In the invention, each blank model is defined by the receiving side. On the other hand the sub-models are additionally different with respect to the processing side. Because of higher costs of storage, administration and mounting when stocking different sub-models for each blank model, such stocking usually is called for only when manufacturing given, standardized small lots.

In a further embodiment mode of the invention, the loaded lens blank is moved into a first operational zone of a milling tool that is fitted with a displaceable spherical cutter rotating about a milling spindle, by rotating the workpiece turret about its main axis of rotation. Such a spherical cutter is especially well suited for rapid, coarse-processing the lens blank. Where requirements cannot be met by said spherical cutter alone, the just above embodiment mode provides that the milling tool also be fitted with a workpiece turret having at least one more milling element which differs from the first spherical cutter. In that event the method of the invention also includes selecting the milling element in order to then position the tool turret in a way to allow engagement between the selected tool and the lens blank. In this manner, and depending on requirement, an appropriate milling tool may be selected. The tools need not be changed manually.

With the milling element the method of invention can be complemented, with a circumferential program, allowing to process the diameter of the selected lens blank to a standard size as a result. By means of such a standardized value, the lens blank subsequently may be held in place in further standard workpiece receptacles. The latter are re-usable and economical.

When carrying out the milling tool's circumferential program, it should include at least time-wise rotating the workpiece receptacle and the lens blank about the spindle axis. In this manner mechanical imbalances are reduced/eliminated and the lens blank then is seated exactly centrally on the workpiece receptacle. Also, the adjustment paths of the milling tool are short and therefore less susceptible to play and vibrations.

The standard size of the lens blank's diameter in the circumferential program preferably exceeds by at most 8 mm the workpiece receptacle's diameter. As a result, almost the whole lens blank is supported on the receiving side. Nevertheless the lens blank's circumference is accessible for processing, for instance to apply bar codes and/or directional marks. Appropriate absolute values of diameters in particular are between 70 mm and 80 mm.

A further development of the method relates to a stage of implementing a surface processing program using the milling tool whereby the lens blank's processing side which is facing away from the workpiece receptacle being processed. This processing by the milling tool is especially rapid. To allow subsequent fine processing, a size increment of 0.15 to 0.25 mm should be allowed in the milling tool's surface processing program relative to the subsequent optically effective surface. The processing rate may be increased by means of an at least temporary rotation of the workpiece receptacle and the lens blank about the spindle axis when carrying out the milling tool's surface processing program.

Furthermore the invention offers an option of carrying out an orientation groove program in which an orientation groove is milled into the lens blank's radial circumference. As a result, rapid alignment of the lens blank is made possible in subsequent processing steps. Preferably this orientation groove is milled 1 to 2 mm deep and in especially preferred manner 1.4 to 1.6 mm deep into the lens blank's circumference. In this manner the orientation groove may be situated outside the workpiece receptacle in order to preclude any damage to this receptacle. This orientation groove also is large enough for alignment and simultaneously it does not significantly restrict the space for processing.

Especially high surface quality may be attained by the method of the present invention when a insertion of the lens blank into a second operational zone of a lathe fitted with an adjustable lathe chisel by rotating the workpiece turret about its main axis of rotation follows a previous step. Lathe tools continuously engage the workpiece. On the other hand a milling cutter alternatingly moves into and out the material. The lathe tools allow continuous chipping, resulting in lesser surface damage from chip vibration. As a result, lathing enables accurate surface manufacture.

In a special embodiment mode of the method of the invention, the surface program executed by means of the lathe comprises a controlled chisel motion and the rotation of the lens blank together with the workpiece receptacle about, the spindle axis. Ideally an endless chip is generated, which should be considered while pre-processing with a milling device and for the related excess dimension for lathing. Preferably the lathe chisel is displaced from the outside toward the spindle axis.

Depending on how much material is removed at the processing side, the invention manufactures the surface geometry first by milling and then, more finely, by turning (lathing). Alternatively however processing may be only by milling or turning, the latter used when the quantity of removed material is minor. But if there is a need for removing much material appropriately the surface processing program will include an increment of material of 0.15 to 0.25 mm in said program for the milling tool relative to that for the lathe.

In the method of the invention, further operational steps may follow the surface programs. This applies in particular to processing the processing side in a fine-grinding and/or polishing program. In such a case the method may be complemented by an adjustable fine-grinding tool in a fifth operational zone. With the fine-grinding tool a fine-grinding program may be performed wherein the position of the fine-grinding tool is controlled and optionally the lens blank together with the workpiece receptacle are rotated about latter's spindle axis.

In a further or additional possible implementation of the invention, the method respectively the equipment is complemented by configuring a distance-controlled polishing tool in a sixth operational zone. With regard to the method, a polishing program may be carried out, where the polishing tool is distance controlled, and optionally the lens blank together with the workpiece receptacle are rotated about latter's spindle axis.

In another embodiment mode of the invention, the method include computing the surface geometry of the lens blank's processing side follows the selection of the lens blank model and takes place, in particular on the basis of a prescription. Due to selecting the blank model and the prescription, the lens shall is shaped optimally. Knowledge of the exact lens blank geometry is essential solely in the method. Such knowledge averts sources of errors and databank incompatibilities for instance of modifications of the lens blank and mismatched data versions in different storage sites. The results of computation may be spherical or aspheric respectively tone or atoric surface geometries of the processing site which also may include bifocal continuous viewing surfaces. The method of the invention also allows computing the processing site as a free-form surface of arbitrary geometry, and to generate it subsequently.

A preferred embodiment mode of the method of the invention stipulates computing the surface geometry of the lens blank's processing side, said blank comprising a central prescription lens zone and an enclosing, tangentially adjoining holding rim. A virtual spectacle frame may be imagined between the prescription lens zone and the holding rim. The geometry of the internal prescription lens zone is due solely to the lens' manufacture. The holding rim optimizes further operational steps. This holding rime zone however must be defined in a manner that it allows accurately executing the processing steps in the prescription lens zone. Gradual transition between prescription lens zone and holding rim is due to said zones adjoining tangentially. In other words, the mathematical derivation is formulated identically or differently on each side of the virtual spectacle frame line; there is no kink in the surface. Accordingly a tool used in fine-grinding and/or polishing the prescription lens zone may be moved beyond the virtual spectacle frame line without any edge pressure arising. Therefore leveling fine structures of the surface geometry does not take place.

Furthermore the holding rim should be of constant thickness at the outer circumference and in particular the lens blank's height at its outer circumference should remain the same in whole or a least mostly the same of said circumference. As a result the workpiece may be held in place in all further transporting and processing steps using standardized tools matching the standardized diameter and the holding rim thickness. This feature offers substantial savings relating to tools, storage and a rapid processing.

The holding rim being dimensionally stable on account of its substantial thickness ideally supports the thin edge of the prescription lens zone along the virtual spectacle frame line. Thus deformations of the lens blank due to the pressure applied by the processing tools is obviated, and high quality of the lens blank's surface geometry is attained.

The lens blanks may be loaded very fast and easily into the workpiece receptacles when the workpiece turret is rotated into a third operational zone by means of a loader loading the selected lens element into the selected workpiece receptacle, simultaneously with generating a partial vacuum between the workpiece receiving surface of the selected workpiece receptacle and the lens blank to be loaded. The said loader is able both to load and evacuate. Alternatively there is the option of configuring a separate evacuation element in a fourth operational zone to evacuate processed lens blanks held in the workpiece receptacles.

The loader should be fitted with a hopper for different models of blanks. In that case the said loader removes the corresponding lens blanks from said hopper. Preferably the lens models may be inserted/replenished separately, without equipment stoppage, into the hopper. Moreover the equipment services orders in altered manner when a blank model no longer is available. To attain such a capability, an illustratively optical or mechanical recognition sensor may be mounted at the hopper.

An engraving tool may be optionally configured in an operational zone. Using a laser or a milling tool, such engraving tool my apply orientation data in the lens blank's rim. Additionally such a tool may engrave data relating to the optical properties of the lens at the lens/lens blank, for instance by means of a bar code preferably situated on the outer periphery.

A subsequent removal of the lens from the holding rim zone should be implemented on a modified equipment. Said removal may take place on the site of method implementation or also at an optician's site. For this removal mechanically driven tools (for instance end millers) or, at the site where the method is carried out, also a water-jet methods, are appropriate tools. If the lens is separated from the holding rim at the site of manufacture, an accurate, virtual contour line of the spectacle frame may be generate at the site of method application, or a contour is generated which is larger by 1 to 2 mm than the virtual contour line in order to give the spectacle optician a processing latitude.

The invention moreover relates to using the equipment for processing lens blanks comprising a workpiece turret rotatable about a main axis of rotation and fitted with at least two workpiece receptacles that are configured outside the main axis of rotation and are supported at said turret to be rotatable about spindle axes, whereby each workpiece receptacle comprises a workpiece receiving surface having a rotationally symmetrical surface curvature about the spindle axis, the surface curvatures of the workpiece receiving surface being mutually different.

Said equipment allows rapidly and economically manufacturing spectacle lenses offering high-quality optical surfaces. Also, storage and stocking costs for tools, holding elements and material are low. Further embodiment modes relate to operating said equipment when complemented by one or more of the above technical features. Further advantages of using said equipment correspond to the above discussed advantages of said equipment and said method.

Further features, particulars and advantages of the present invention are subject to the claims and the following description of illustrative embodiment modes in relation to the appended drawings.

Figure 1A:
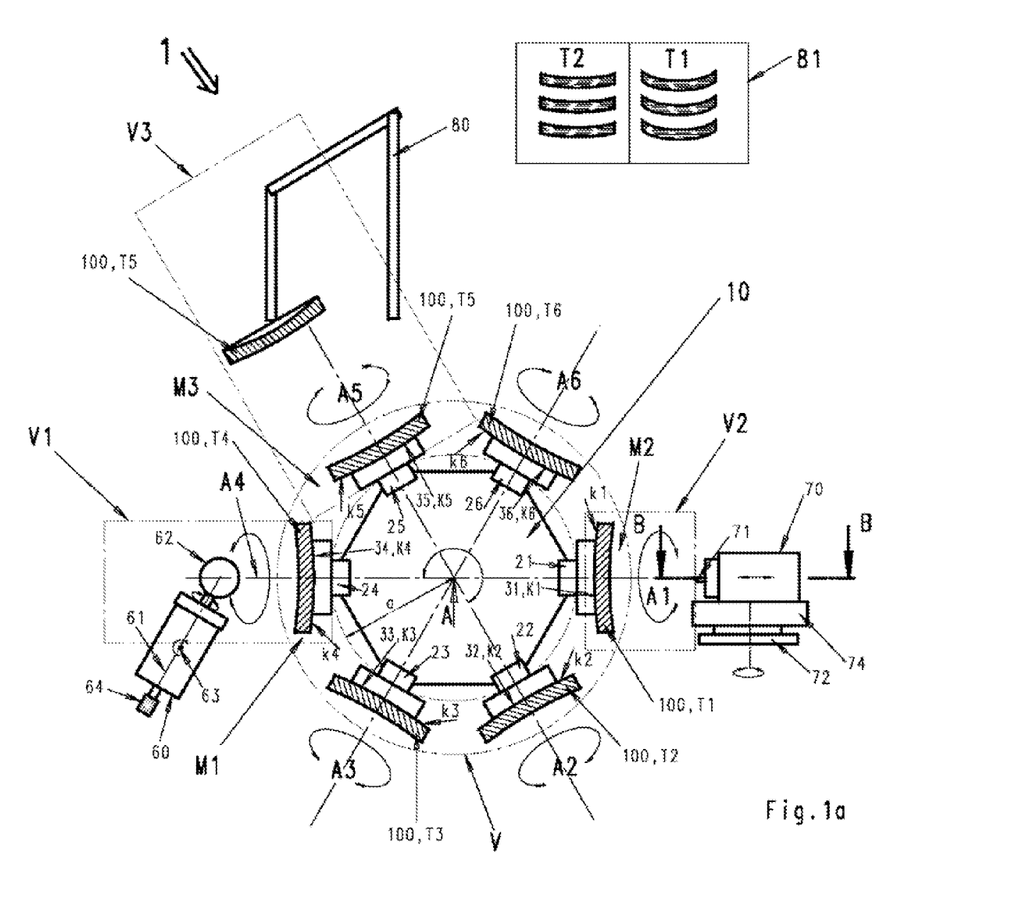
FIG. 1*a* is a schematic of equipment to process (spectacle) lens blanks.

FIG. 1 schematically shows an equipment 1 to process spectacle lens blanks 100, hereafter lens blanks 100. A workpiece turret 10 supported to be rotatable about a main axis A comprises six workpiece receptacles 21, 22, 23, 24, 25, 26 which are configured outside said main axis of rotation A, supported at the workpiece turret 10 and rotatable about spindle axes A1, A2, A3, A4, A5, A6. The workpiece turret 10 is supported to be rotatable through 360° about the main axis of rotation A.

Each workpiece receptacle 21, 22, 23, 24, 25, 26 comprises a workpiece receiving surface 31, 32, 33, 34, 35, 36 having surface curvature K1, K2, K3, K4, K5, K6 rotationally symmetrical about the spindle axis A1, A2, A3, A4, A5, A6. The surface curvatures K1, K2, K3, K4, K5, K6 of the workpiece receiving surfaces 31, 32, 33, 34, 35, 36 however do differ from one another. In particular, the workpiece receiving surfaces 31, 32, 33, 34, 35, 36 are concave, and their surface curvatures K1, K2, K3, K4, K5, K6 are graduated. One may note that the distance "a" between all workpiece receptacles 21, 22, 23, 24, 25, 26 to the main axis of rotation A is constant. The outside diameters of the workpiece receptacles 21, 22, 23, 24, 25, 26 are all equal. Moreover each workpiece receptacle 21, 22, 23, 24, 25, 26 is separately driven into rotation about its spindle axis A1, A2, A3, A4, A5, A6.

FIG. 1 also clearly shows the workpiece receptacles 21, 22, 23, 24, 25, 26 being uniformly and radially distributed relatively to the main axis of rotation A of the workpiece turret 10. The spindle axes A1, A2, A3, A4, A5, A6 each subtend an equal angle with the main axis of rotation A. In particular the spindle axes A1, A2, A3, A4, A5, A6 of the workpiece receptacles 21, 22, 23, 24, 25, 26 perpendicularly intersect the main axis of rotation A of the workpiece turret 10. Moreover all the spindle axes A1, A2, A3, A4, A5, A6 are situated in one plane perpendicular to the main axis of rotation A.

Figure 2:
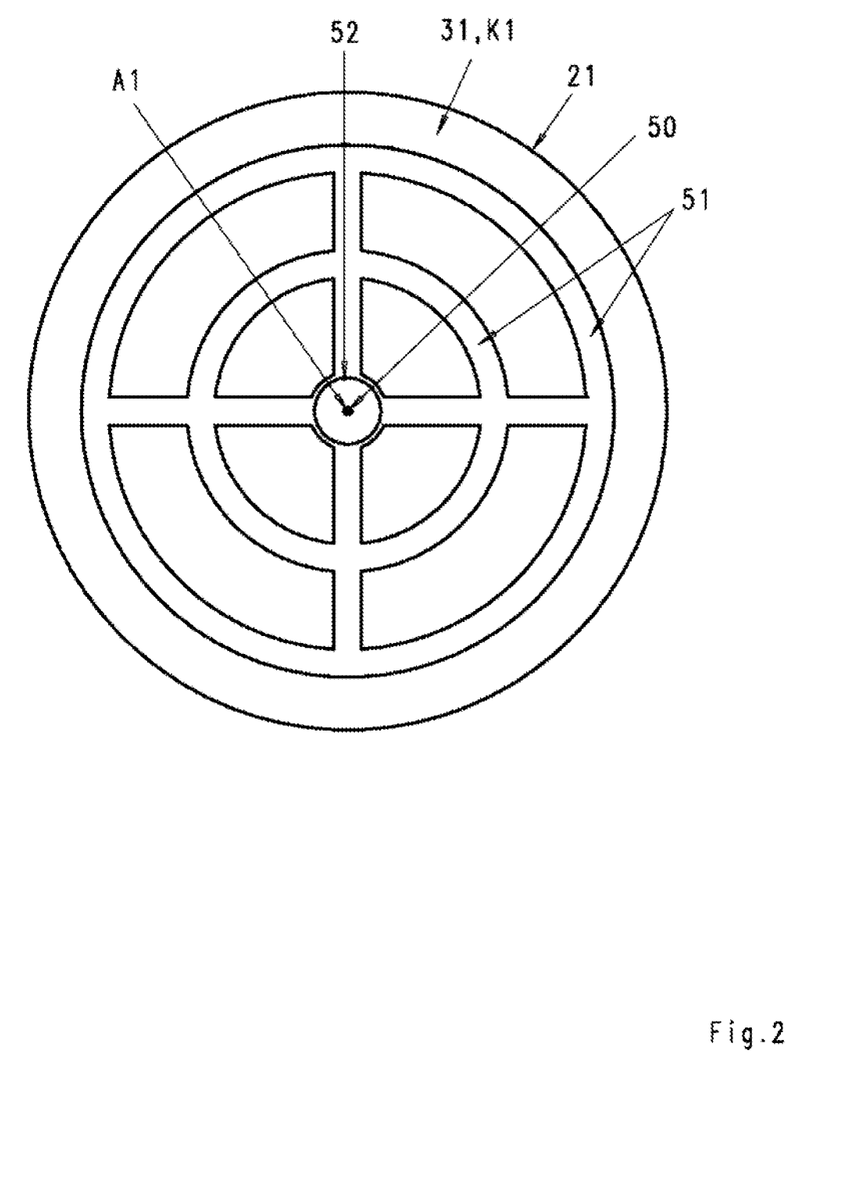
FIG. 2 is a schematic from view of a workpiece receiving surface of a workpiece receptacle having a suction element.

No detailed figures and description of suction elements at the workpiece receptacles 21, 22, 23, 24, 25, 26 are provided herein. An exemplary configuration is indicated in FIG. 2 at a single workpiece receptacle 21. Furthermore the suction elements 50 of each single workpiece receptacle 21, 22, 23, 24, 25, 26 should be switched pneumatically separately and the workpiece receptacle surfaces 31, 32, 33, 34, 35, 36 should be fitted with flutings, which are connected pneumatically with a suction conduit. Just as a power feed, the suction conduit may run centrally out of the workpiece turret 10 in an irrotational equipment component. Said irrotational equipment component, a mashine foundation and mashine casing that machine is not shown but may complement said equipment.

Operational zones V1, V2, V3 for processing the lens blanks 100 are configured radially to the main axis of rotation A and comprise each an intersection volume M1, M2, M3 with the rotational space V of the workpiece turret 10 (including the lens blanks 100 to be processed). The operational zones V1, V2, V3 are radially distributed about the main axis of rotation A. In particular all operational zones V1, V2, V3 correspond to a workpiece receptacle 21, 22, 23, 24, 25, 26 when a single one of them is situated in an operational zone V1, V2, V3.

A milling component 60 with a displaceable rotatable spherical cutter bit 62 rotatable about a milling spindle 61 is configured in a first operational zone V1. The diameter of the spherical milling bit perpendicularly to the milling spindle 61 is exactly the same as its dimension in the direction of the milling spindle 61. In the light of the size ratio relative to the lens blanks 100, of which exhibits a diameter between 70 and 80 mm, a diameter of about 30 mm of the spherical cutter bit 62 can be concluded. Also, the milling component 60 includes a tool turret 63 fitted with a second milling bit 64 differing from the spherical cutter bit 62.

Figure 1B:
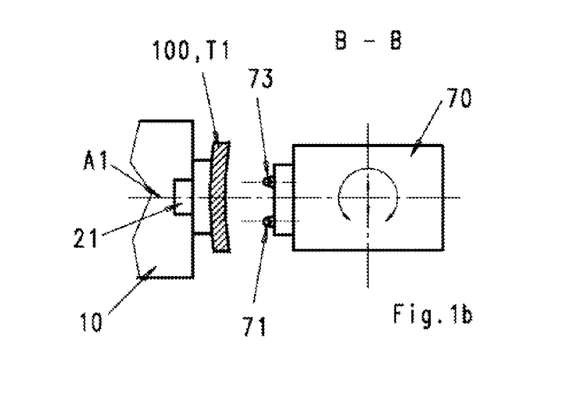
FIG. 1*b* is a section of the first workpiece receptacle shown in FIG. 1*a* and of the lathe.

A second operational zone V2 is situated in the region of a lathe 70 fitted with a displaceable turning chisel 71. This second operational zone V2 also is shown from another perspective in a section B-B in FIG. 1b. The lathe 70 comprises a FASTtoolServo drive 74 to allow processing of surfaces which are not rotationally symmetrical. For that purpose said FASTtoolServo drive 74 is fitted with actuators comprising piezo-elements. Also it is feasible to change in controlled manner the angular position of the lathe 70 relative to the spindle axis A1, A2, A3, A4, A5, A6 (in the shown direction opposite the first spindle axis A1) of an oppositely situated workpiece receptacle 21, 22, 23, 24, 25, 26 (in the shown direction of the first workpiece receptacle 21). Said lathe 70 comprises in this instance a second lathe chisel 73 differing from the first lathe chisel 71, as shown in FIG. 1b. The lathe chisels 71, 73 are near each other and are driven jointly by the FASTtoolServo drive 74. The two lathe chisels 71, 73 are fitted with cutting edges of different radii. However only one of the lathes chisels 71, 73 should engage the lens blank 100 during processing.

As shown by the Figures, the lathe 70 and the milling tool 60 are oppositely situated relative to the main axis of rotation A of the workpiece turret 10. Only the array of the drawing suggests that the main axis of rotation A is directed geodetically horizontally. The lathe 70 and the milling tool 60 also are situated at the same geodetic height.

A loader 80 to load lens blanks 100 into fee workpiece receptacles 21, 22, 23, 24, 25, 26 is situated in a third operational zone V3. Said loader is designed as a robot arm with a gripper and performs both loading and evacuation. It also has access to a hopper 81 to hold different models of blanks, namely blank T1, T2, Y3, T4, T5, T6.

The equipment 1 shown in FIG. 1 henceforth is suitable to carry out a method of the invention to process lens blanks 100, wherein at least two blank models T1, T2, T3, T4, T5, T6 of different receiving-side surface curvatures k1, k2, k3, k4, k5, k6 are being selectable, said method comprising the following steps:

I. Selecting a blank model T1, T2, T3, T4, T5, T6,
II. Selecting a workpiece receptacle 21, 22, 23, 24, 25, 26 having a workpiece receiving surface 31, 32, 33, 34, 35, 36 of which the surface curvature K1, K2, K3, K4, K5, K6 corresponds to the surface curvature k1, k2, k3, k4, k5, k6 of the receiving side of the selected blank model T1, T2, T3, T4, T5, T6.
III. Positioning the selected workpiece receptacle 21, 22, 23, 24, 25, 26 by rotating the workpiece turret 10 holding the workpiece receptacles 21, 22, 23, 24, 25, 26 about said turret's main axis of rotation A,
IV. Loading a spectacle lens blank 100 of the selected blank model T1, T2 T3, T4, T5, T6 into the selected and positioned workpiece receptacle 21, 22, 23, 24, 25, 26,
V. Positioning the loaded lens blank 100 for purposes of ensuing processing VI.1, VI2, VI3, VI.4, VI.5, VI.6 by rotating the workpiece turret 10 about is main axis of rotation A.

The method of the invention is especially well suited to process circular lens blanks 100 made of glass or plastic having an optically effective receiving side 101. Preferably the lens blanks 100 evince a rotationally symmetric receiving side 101 and a rotationally symmetric processing side 102. The number of workpiece receptacles 21, 22, 23, 24, 25, 26 corresponds to the number of blank models T1, T2, T3, T4, T5, T6. Said number in this illustrative embodiment mode is six. The six bank models T1,T2,T3,T4,T5,T6 evince graduated convex surface curvatures k1, k2, k3, k4, k5, k6. The radius of curvature of the first blank model T1 is the smallest and rises in graduated manner up to the blank model T6. The first five blank models T1, T2, T3, T4, T5 have convex surface curvature k1, k2, k3, k4, k5 k6 of constant radius. On the other hand the receiving side 101 of the sixth blank model T6 is composed of tangentially adjoining annuli of different radii which become smaller from the center to the outside as their spacing increases. The suitable blank model T1, T2, T3, T4, T5, T6 may be selected depending on the prescription. Alternatively, however, the blank models T1, T2, T3, T4, T5, T6 may also be combined with other surface curvatures k1, k2, k3, k4, k5, k6.

Figure 3:
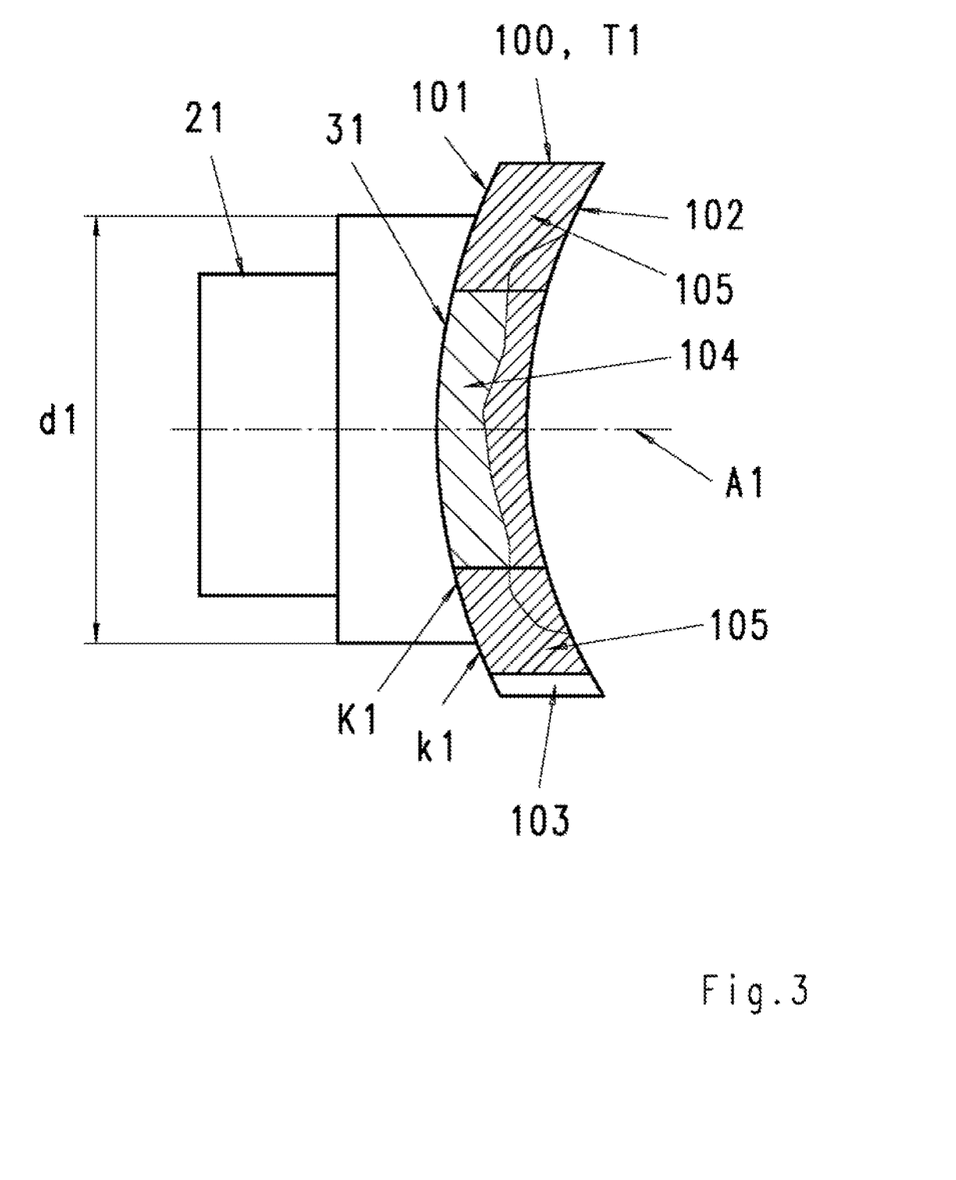
FIG. 3 is schematic side view of a workpiece receptacle with received lens blank.

As shown, a lens blank 100 of the blank model T4 is received in the fourth workpiece receptacle 24 and, due to rotating the workpiece turret about its main axis of rotation A, it was moved into the first operational zone V1. Implementation of an outer periphery program can now take place by means of a milling tool 60, whereby the diameter of the selected lens blank 100 is being reduced to a standard size. From time to time, the workpiece receptacle 21, 22, 23, 24, 25, 26 and the lens blank 100 are rotated about the spindle axis A1, A2, A3, A4, A5, A6. Subsequently surface processing using the milling tool 60 is carried out, wherein the lens blank's processing side 102 pointing away from the workpiece receptacle 21, 22, 23, 24, 25, 26 is processed, in this embodiment mode, the workpiece receptacle 21, 22, 23, 24, 25, 26 with the lens blank 100 is rotated from time to time about the spindle axis A1, A2, A3, A4, A5, A6. Finally an orientation groove program is carried out using the milling tool 60 during which an orientation groove 103 is milled into the periphery of the lens blank 100. The orientation groove 103 for instance shown in FIG. 3 is milled 1.5 mm deep into the periphery of the lens blank 100.

The lens blank 100 of the first blank model T1 already processed by the milling tool 60 is situated together with the first workpiece receptacle 21 holding it in the second operational zone V2. A surface program is implemented by the lathe 70, wherein each time one of the lathe chisels 71, 73 is driven into displacement, and the lens blank 100 and the workpiece receptacle 21, 22, 23, 24, 25, 26 are rotated about the spindle axis A1, A2, A3, A4, A5, A6. For lathing excess material of 0.15 to 0.25 mm was allowed in a prior surface processing program of the milling tool 60.

As shown, the lens blank 100 of the fifth blank model T5 is located in the third operational zone V3. In this zone the loader 80 loading a selected lens blank 100 in the selected workpiece receptacle 21, 22, 23, 24, 25, 26 is located. Said loader also assures discharging the processed lens blanks 100.

Discussion of a computation and control unit, is deliberately omitted. Such a unit allows computing the desired surface geometries. Thereupon the motions of the loader 80 may be determined, further those of the workpiece turret 10, the rotation of the workpiece receptacles 21, 22, 23, 24, 25, 26, the milling tool 60 and the lathe 70. Also said components are regulated and/or driven by the regulating unit according to the computation.

The processing side (102) is processed in this manner by means of said computations into a spherical or aspherical resp. toric or atoric surface which also may contain bifocal vision surfaces.

In this procedure the computational and regulatory unit takes into account a central prescription lens zone 104 and a surrounding, tangentially adjoining holding rim 105. Within the constraints of the prescription lens range, the holding rim 105 is designed being of constant thickness at the outer periphery.

FIG. 2 is a schematic front view of a first workpiece receiving surface 31 of a first workpiece receptacle 21 fitted with a suction element 50. Said suction element comprises flutings 51 fitted into the workpiece receiving surface 31. These flutings are connected pneumatically with a suction conduit 52. It may be noted that said conduit 52 runs axially toward the first spindle axis A1 through the first workpiece receptacle 31 to the workpiece receiving surface 31. From there the suction conduit 52 branches radially into flutings 51. The flutings 51 comprise radially extending flutings 51 as well as distributing flutings 51 running from the spindle axis A1 outward. A vacuum may be implemented in this manner between the workpiece receiving surface 31 and the lens blank 100 to be loaded. The shown perspective only suggests the first surface curvature K1 of the workpiece receiving surface 31. However it is clearly shown in FIG. 3.

FIG. 3 is a schematic side view of a first workpiece receptacle 21 holding a lens blank 100. The first workpiece receptacle 21 comprises a first spindle axis A1 about which said receptacle may rotate in the assembled state. Also the first workpiece receptacle 21 comprises a first workpiece receiving surface 31 having a first surface curvature K1 rotationally symmetric about the first spindle axis A1.

The received lens blank 100 is a first blank model T1 with a surface curvature k1 on the receiving side 101.

The first surface curvature K1 of the workpiece receptacle 31 corresponds to the surface curvature k1 of the receiving side 101 of the first, blank model T1. As a result the resting surface between the workpiece receiving surface 31 and the receiving side 101 is large.

It can be noted that the first workpiece receptacle 21 has a diameter d1 smaller than the diameter of the lens blank 100.

Next, using a surface processing program, the received lens blank 100 can be processed, by means of a milling tool or a lathe, at the processing side 102 pointing away from the workpiece receptacle 21, 22, 23, 24, 25, 26. The computation of the surface geometry of the processing side 102 may take into account a central prescription lens zone 104 and a tangentially adjoining and enclosing holding rim 105.

Also shown in FIG. 3, an orientation groove 103 is present radially downward in the direction of the figure, in the periphery of the lens blank 100.

Figure 4:
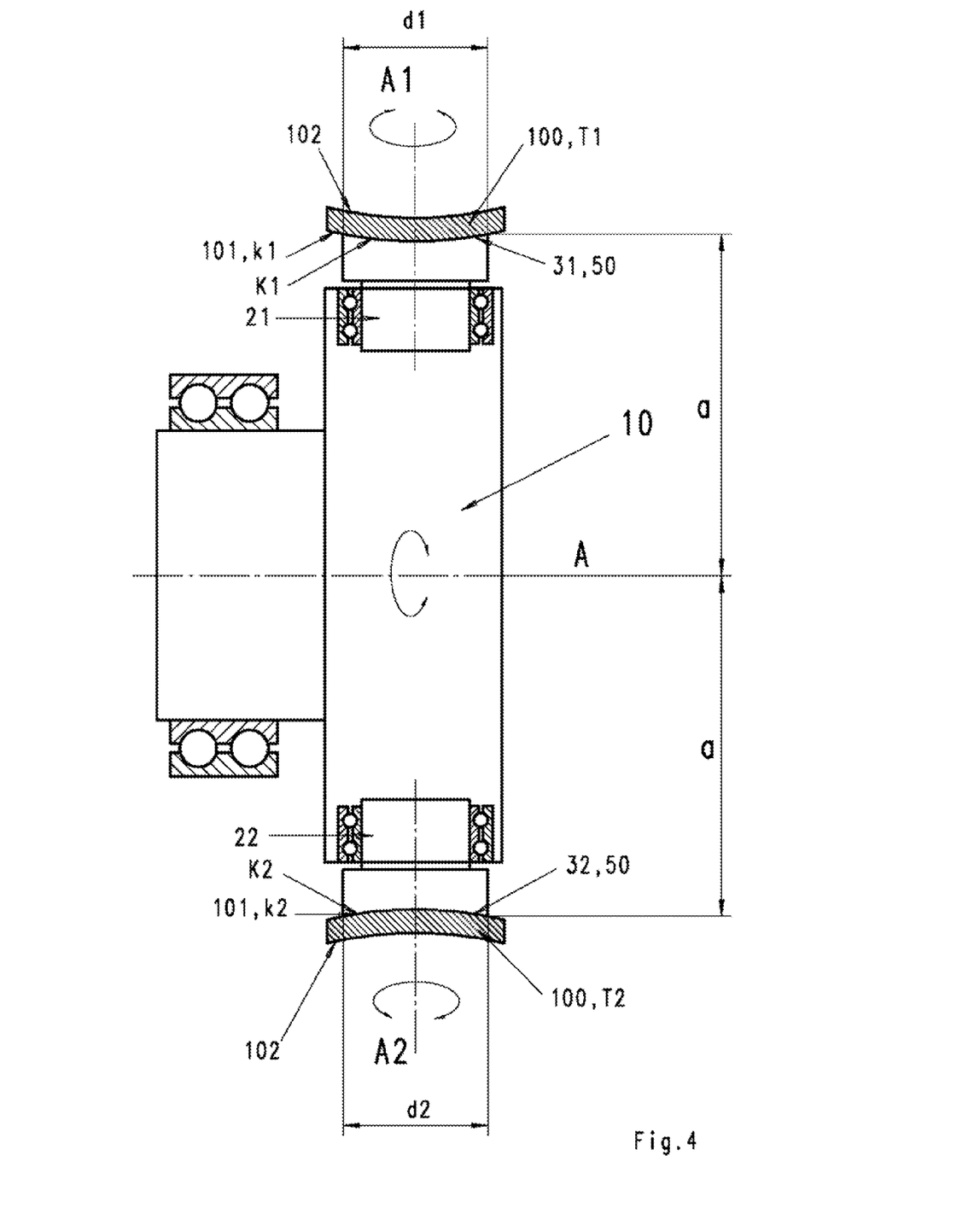
FIG. 4 is a further schematic representation of equipment to process lens blanks.

FIG. 4 is a view of further equipment 1, shown schematically, to process lens blanks 100. A workpiece turret 10 supported to rotate around a main axis of rotation A comprises at least two (as shown) workpiece receptacles 21, 22 configured outside the axis of rotation A and supported at the workpiece turret 10 and rotatable about the workplaces spindles 21, 22. The workpiece turret 10 is rotatable though 360° about the main axis of rotation.

Each workpiece receptacle 21, 22 comprises a workpiece receiving surface 31, 32 having a rotationally symmetrical surface curvature K1, K2 about the spindle axis A1, A2. The surface curvatures K1, K2 of the workpiece receiving surfaces 31, 32 are different from each other however. In particular the workpiece receiving surfaces 31, 32 are concave and their surface curvatures K1, K2 are graduated. It can be noted that the spacing "a" between all workpiece receptacles 21, 22 to the main axis of rotation is the same. The outside diameter d1, d2 of the workpiece receptacles 21, 22 is always equal. Also, each workpiece receptacle 21, 22 is driven in rotation separately around their spindle axis A1, A2.

Moreover, as clearly shown, the workpiece receptacles 21, 22 are distributed equally radially about the main axis of rotation A of the workpiece turret 10. The spindle axes A1, A2 each subtend the same angle with the main axis of rotation A. In particular the spindle axes A1, A2 are perpendicular to the main axis of rotation A of the workpiece turret 10 and intersect said main axis. Also the spindle axes A1, A2 of the workpiece receptacles 21, 22 run in a common plane orthogonally to the main axis of rotation A and latter runs centrally between the workpiece receptacles 21, 22.

A detailed account and characterization of suction elements at the individual workpiece receptacles 21, 22 are deliberately omitted. Illustratively they may be structured as shown in relation to a single workpiece receptacle 21 in FIG. 2. The suction elements of each workpiece receptacle 23, 22 should be separately switched pneumatically, and flutings should be fitted into the workpiece receiving surface 31, 32 and be pneumatically connected with a suction conduit. This suction conduit as well as an electric power feed should run centrally from the workpiece turret 10 to an irrotational part of the equipment. Said irrotational equipment part, a machine foundation and a machine casing are not shown.

Each workpiece receptacle 21, 22 receives circular lens blanks 100 having an optically effective receiving side 101. These receiving sides 101 and opposite processing sides 102 are rotationally symmetrical. Also the number of workpiece receptacles 21, 22 corresponds to the number of different blank models T1, T2. The view shows two different kinds of blank models T1, T2 having different surface curvatures k1, k2 on the receiving side 101. The surface curvature k1 of the first blank model T1 is smaller than that of the second lank model T2. Depending on prescription, a selection may be made from the blank models T1, T2.

The workpiece receptacles 21, 22 may be moved to different fools by rotating the workpiece turret about its main axis of rotation A. Further related possible structuring of the periphery of the workpiece turret 10, in particular of the operational zones, relate to the embodiment modes of FIGS. 1a and 1b.

The invention is not restricted to the above described embodiment modes, on the contrary it may be modified in versatile manner.

All features and advantages of the present invention, including design details, spatial configurations and procedural steps explicit in and implicit from the claims, the specification and the drawing, may be construed being inventive per se or in arbitrary combinations.

LIST OF REFERENCES 1 equipment
10 workpiece turret
21 first workpiece receptacle
22 second workpiece receptacle
23 Third workpiece receptacle
24 fourth workpiece receptacle
25 fifth workpiece receptacle
26 sixth workpiece receptacle
31 first workpiece receiving surface
32 second workpiece receiving surface
33 Third workpiece receiving surface
34 fourth workpiece receiving surface
35 fifth workpiece receiving surface
36 sixth workpiece receiving surface
50 suction element
51 flutings
52 suction conduit
60 milling tool
61 milling spindle
62 spherical milling cutter
64 second milling tool
70 lathe
71 lathe chisel
73 second lathe chisel
74 FASTtoolServo drive
80 loader
81 hopper
100 (spectacle) lens blank
101 receiving side
102 processing side
103 orientation groove
104 prescription lens zone
105 holding rim
A main axis of rotation
A1 first spindle axis
A2 second spindle axis
A3 Third spindle axis
A4 fourth spindle axis
A5 fifth spindle axis
A6 sixth spindle axis
a distance/spacing between workpiece receptacle and main axis of rotation
d1 workpiece receptacle first diameter
d2 workpiece receptacle second diameter
K1 receptacle first surface curvature
K2 receptacle second surface curvature
K3 receptacle third surface curvature
K4 receptacle fourth surface curvature
K5 receptacle fifth surface curvature
K6 receptacle sixth surface curvature
k1 blank first surface curvature
k2 blank second surface curvature
k3 blank third surface curvature
k4 blank fourth surface curvature
k5 blank fifth surface curvature
k6 blank sixth surface curvature
M1 first intersection volume
M2 second intersection volume
M3 third intersection volume
T1 first blank model
T2 second blank model
T3 third blank model
T4 fourth blank model
T5 fifth blank model
T6 sixth blank model
V rotational space
V1 first operational zone
V2 second operational zone
V3 third operational zone

The invention claimed is:

1. A method for processing spectacle lens blanks (100) using equipment, the equipment comprising a workpiece turret (10) supported to be rotatable about a main axis of rotation (A), with at least two workpiece receptacles (21, 22, 23, 24, 25, 26) rotatably supported on said turret, each workpiece receptacle (21, 22, 23, 24, 25, 26) being fitted with a workpiece receiving surface (31, 32, 33, 34, 35, 36), said workpiece receiving surface (31, 32, 33, 34, 35, 36) having a concave or convex surface curvature (K1, K2, K3, K4, K5, K6), said workpiece receiving surface (31, 32, 33, 34, 35, 36) evincing a surface curvature, which is rotationally symmetrical about a spindle axis (A1, A2, A3, A4, A5, A6), wherein extents of the convex or concave surface curvatures (K1, K2, K3, K4, K5, K6) of the workpiece receiving surfaces (31, 32, 33, 34, 35, 36) are different from each other so as to receive lens blanks (100) with a receiving side (101) of different convex or concave surface curvatures (k1, k2, k3, k4, k5, k6) such that each received lens blank (100) is supported by the workpiece receiving surface (31, 32, 33, 34, 35, 36) during subsequent processing from the direction of the receiving side (101) not to be processed, where at least two blank models (T1, T2, T3, T4, T5, T6) of lens blanks (100) with a receiving side (101) of different concave or convex surface curvatures (k1, k2, k3, k4, k5, k6) may be selected, each workpiece receptacle (21, 22, 23, 24, 25, 26) fitted with a suction element (50), wherein each workpiece receptacle (21, 22, 23, 24, 25, 26) is configured to be driven into rotation about its spindle axis (A1, A2, A3, A4, A5, A6) separately from another workpiece receptacle, the method comprising the following steps:
- I. selecting one of the at least two blank models (T1, T2, T3, T4, T5, T6),
- II. selecting one of the workpiece receptacles (21, 22, 23, 24, 25, 26) having a workpiece receiving surface (31, 32, 33, 34, 35, 36) of which the concave or convex surface curvature (K1, K2, K3, K4, K5, K6) corresponds to the concave or convex surface curvature (k1, k2, k3, k4, k5, k6) of the receiving side (101) of the selected blank model (T1, T2, T3, T4, T5, T6),
- III. positioning the selected workpiece receptacle (21, 22, 23, 24, 25, 26) by rotating the workpiece turret (10) holding the workpiece receptacle (21, 22, 23, 24, 25, 26) about said turret's main axis of rotation (A),
- IV. loading a lens blank (100) of the selected blank model (T1, T2, T3, T4, T5, T6) Into the selected and positioned workpiece receptacle (21, 22, 23, 24, 25, 26),
- V. positioning the loaded lens blank (100) appropriately for an ensuing processing procedure (VI.1, VI.2, VI.3, VI.4, VI.5, VI.6) by rotating the workpiece turret (10) about its main axis of rotation (A), and
- VI. moving the lens blank (100) into a second operational zone (V2) of a lathe (70) fitted with an adjustable lathe chisel (71, 73) by rotating the workpiece turret (10) about its main axis of rotation (A).

2. The method as claimed in claim 1, characterized by the following step:
- VI.1 moving the loaded lens blank (100) into a first operational zone (V1) of a milling tool (60) fitted with a position-controllable spherical milling cutter (62) rotatable about a milling spindle (61), by rotating the workpiece turret (10) about its main axis of rotation (A).

3. The method as claimed in claim 2, characterized by the following step:
- VI.2 implementing a periphery program by means of the milling tool (60), whereby the diameter of the selected lens blank (100) is adjusted to a standard size.

4. The method as claimed in claim 2, characterized by the following step:
- VI.3 implementing a surface processing program using the milling tool (60), whereby the processing side (102) of the lens blank (100) is pointing away from the workpiece receptacle (21, 22, 23, 24, 25, 26) and being processed in this step.

5. The method as claimed in claim 2, characterized by the following step:
- VI.4 implementing an orientation groove program using the milling tool (60), wherein an orientation groove (103) is milled into the radial periphery of the lens blank (100).

6. The method as claimed in claim 1, characterized by the following step:
- VI.6 implementing a surface program using the lathe (70) where the lathe chisel (71, 73) is adjusted in controlled manner and the lens blank (100) together with the workpiece receptacle (21, 22, 23, 24, 25, 26) are rotated about the spindle axis (A1, A2, A3, A4, A5, A6).

7. The method as claimed in claim 1, characterized by the following step:
- IV.1 rotating the workpiece turret (10) in a third operational range (V3) fitted with a loader (80) to load a selected lens blank (100) into the selected workpiece receptacle (21, 22, 23, 24, 25, 26),
- IV.2 generating a vacuum between the workpiece receiving surface (31, 32, 33, 34, 35, 36) of the selected workpiece receptacle (21, 22, 23, 24, 25, 26) and the lens blank to be loaded.

* * * * *